United States Patent
Cho et al.

(10) Patent No.: US 10,166,967 B2
(45) Date of Patent: Jan. 1, 2019

(54) SHIFTING CONTROL METHOD FOR HYBRID VEHICLE

(71) Applicant: Hyundai Motor Company, Seoul (KR)

(72) Inventors: Sung Hyun Cho, Yongin-si (KR); Ju Hyun Nam, Bucheon-si (KR); Seong Hwan Cheong, Suwon-si (KR)

(73) Assignee: Hyundai Motor Company, Seoul (KR)

(*) Notice: Subject to any disclaimer, the term of this patent is extended or adjusted under 35 U.S.C. 154(b) by 141 days.

(21) Appl. No.: 15/334,683

(22) Filed: Oct. 26, 2016

(65) Prior Publication Data

US 2017/0361830 A1 Dec. 21, 2017

(30) Foreign Application Priority Data

Jun. 16, 2016 (KR) .................. 10-2016-0074905

(51) Int. Cl.
*F16H 61/04* (2006.01)
*B60W 30/19* (2012.01)
(Continued)

(52) U.S. Cl.
CPC ............ *B60W 20/10* (2013.01); *B60W 10/02* (2013.01); *B60W 10/06* (2013.01); *B60W 10/08* (2013.01); *B60W 10/113* (2013.01); *B60W 30/18063* (2013.01); *B60W 30/19* (2013.01); *F16H 61/04* (2013.01); *B60W 2510/081* (2013.01); *B60W 2510/083* (2013.01); *B60W 2510/1015* (2013.01); *B60W 2710/021* (2013.01); *B60W 2710/081* (2013.01); *B60W 2710/083* (2013.01); *B60W 2710/1005* (2013.01); *Y10S 903/93* (2013.01); *Y10S 903/945* (2013.01); *Y10S 903/946* (2013.01)

(58) Field of Classification Search
None
See application file for complete search history.

(56) References Cited

U.S. PATENT DOCUMENTS

| 2007/0117676 A1* | 5/2007 | Ayabe | F16H 59/46 477/34 |
| 2008/0220933 A1* | 9/2008 | Maeda | B60K 6/26 477/3 |
| 2014/0303825 A1* | 10/2014 | Tsuda | B60W 10/115 701/22 |

FOREIGN PATENT DOCUMENTS

| JP | 2015-160462 A | 9/2015 |
| JP | 2016-010235 A | 1/2016 |

(Continued)

*Primary Examiner* — Justin Holmes
(74) *Attorney, Agent, or Firm* — Morgan, Lewis & Bockius LLP

(57) ABSTRACT

A shifting control method for a hybrid vehicle may include motor torque determination step, of determining the condition of a motor torque, by a controller, in a power-off downshift shifting process, gear mesh step, by the controller, of releasing a clutch of a releasing side and meshing a target shifting stage gear connected to a clutch of engaging side when the motor torque is positive (+) torque, an assist control step, of controlling, by the controller, the motor torque to 0 Nm, a rising step, by the controller, of controlling the motor speed to rise and follow a target motor speed predetermined higher than at least an input shaft speed of an engaging side after releasing the assist control, and an engaging step, by the controller, of engaging the clutch of the engaging side by a clutch torque of the engaging side when the motor speed exceeds the input shaft speed of the engaging side.

4 Claims, 2 Drawing Sheets

(51) Int. Cl.
*B60W 20/10* (2016.01)
*B60W 10/02* (2006.01)
*B60W 10/08* (2006.01)
*B60W 10/113* (2012.01)
*B60W 30/18* (2012.01)
*B60W 10/06* (2006.01)

(56) References Cited

FOREIGN PATENT DOCUMENTS

| | | |
|---|---|---|
| KR | 10-2012-0031612 A | 4/2012 |
| KR | 10-2014-0077352 A | 6/2014 |
| KR | 10-1510016 B1 | 4/2015 |
| KR | 10-2015-0071119 A | 6/2015 |

* cited by examiner

SHIFTING CONTROL METHOD FOR HYBRID VEHICLE

CROSS REFERENCE TO RELATED APPLICATION

The present application claims priority to Korean Patent Application No. 10-2016-0074905, filed Jun. 16, 2016, the entire contents of which is incorporated herein for all purposes by this reference.

BACKGROUND OF THE INVENTION

Field of the Invention

The present invention relates to a shifting control method for a hybrid vehicle capable of securing shifting feeling through clutch control strategy corresponding to shifting situation depending on torque level inputted from a motor to a transmission.

Description of Related Art

An automated manual transmission is a system automatically controlling a transmission based on a manual shifting mechanism and which transmits an engine torque by using a dry clutch contrary to an automatic transmission using a torque converter and a wet multi-disc clutch.

However, since the dry clutch has characteristics that a clutch transmission torque varies greatly depending on many factors such as single part tolerance of configuration elements, abrasion degree by endurance progress, thermal deformation by high temperature and variation in friction coefficient of a disk, and so on, it is difficult to anticipate the torque being transmitted to the dry clutch during vehicle travels.

Therefore, since excessive slip occurs in the dry clutch or a shock occurs in a case that the variation of the transmission torque is not recognized during controlling the dry clutch, an algorithm is necessary for predicting torque characteristics of the dry clutch in real time.

Thus, the transmission torque characteristic of the dry clutch has been predicted through a clutch control predicting a transmission torque map characteristic curve (torque-stroke curve: T-S curve) of the dry clutch in the prior art. The transmission torque map characteristic curve (T-S curve) of the dry clutch is a curve making the transmission torque characteristic of the dry clutch according to a stroke of a clutch actuator to data.

Meanwhile, a hybrid vehicle carries out regenerative braking by using a motor. That is, by directly connecting the motor to a wheel until the hybrid vehicle is stopped, it is possible to control in order for the braking force of the motor to be continuously transmitted to the wheel, thereby maximizing the improvement of fuel efficiency.

However, if the shifting is carried out in situations just before the hybrid vehicle is stopped as the hybrid vehicle speed is very low by the regenerative braking, there is a problem that shifting stability is reduced.

For example, in a case that a power-off downshift shifting is carried out from the second stage to the first stage, since the hybrid vehicle speed at this time is very low mostly about 2~3 KPH, the speed difference between an input shaft speed at releasing side forming the second stage and an input shaft speed at engaging side for forming the first stage is small.

Therefore, in a case that the characteristic curve, Torque-Stroke curve (T-S curve), of the clutches of the engaging side and the releasing side is incorrect in this situation, if the normal power-off downshift shifting is carried out, the probability that an interlock shock occurs becomes high such that there will be a problem of reducing the shifting feelings.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a shifting control method for a hybrid vehicle capable of securing shifting feeling through clutch control strategy corresponding to shifting situation depending on torque level inputted from a motor to a transmission.

According to various aspects of the present invention, a shifting control method for a hybrid vehicle may include a motor torque determination step, of determining the condition of a motor torque, by a controller, in a power-off downshift shifting process, a gear mesh step, by the controller, of releasing a clutch of a releasing side and meshing a target shifting stage gear connected to a clutch of engaging side when the motor torque is positive (+) torque, an assist control step, of controlling, by the controller, the motor torque to 0 Nm, a rising step, by the controller, of controlling the motor speed to rise and follow a target motor speed predetermined higher than at least an input shaft speed of an engaging side after releasing the assist control, and an engaging step, by the controller, of engaging the clutch of the engaging side by a clutch torque of the engaging side when the motor speed exceeds the input shaft speed of the engaging side. Here, the 0 Nm signifies zero Newton meter.

The shifting control method for the hybrid vehicle may further include shifting determination step, by the controller, of determining when the present shifting is a power-off downshift shifting from a second stage to a first stage or not, before the motor torque determination step.

A downshift shifting may be carried out through a torque handover control of engaging the clutch of the engaging side and simultaneously releasing the clutch of the releasing side when it is determined that the motor torque is negative (−) torque at the motor torque determination step.

The target motor speed may be a motor speed corresponding to a predetermined creep torque at the rising step.

According to the shifting control method for a hybrid vehicle through the above problem solving means, the motor speed is synchronized to an input shaft speed of engaging side through the motor control and the clutch of the engaging side is engaged after the clutch of releasing side is released in a situation that the power off 2→1 downshift shifting as the motor torque is (+) torque is carried out, such that it is possible to prevent an interlock shock in the related shifting situation from being occurred, and thus, secure the shifting feelings.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogenpowered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The shifting control method for a hybrid vehicle according to various embodiments of the present invention may mainly include a motor torque determination step, a gear meshing step, an assist control step, a rising step, and an engaging step.

Figure 1:
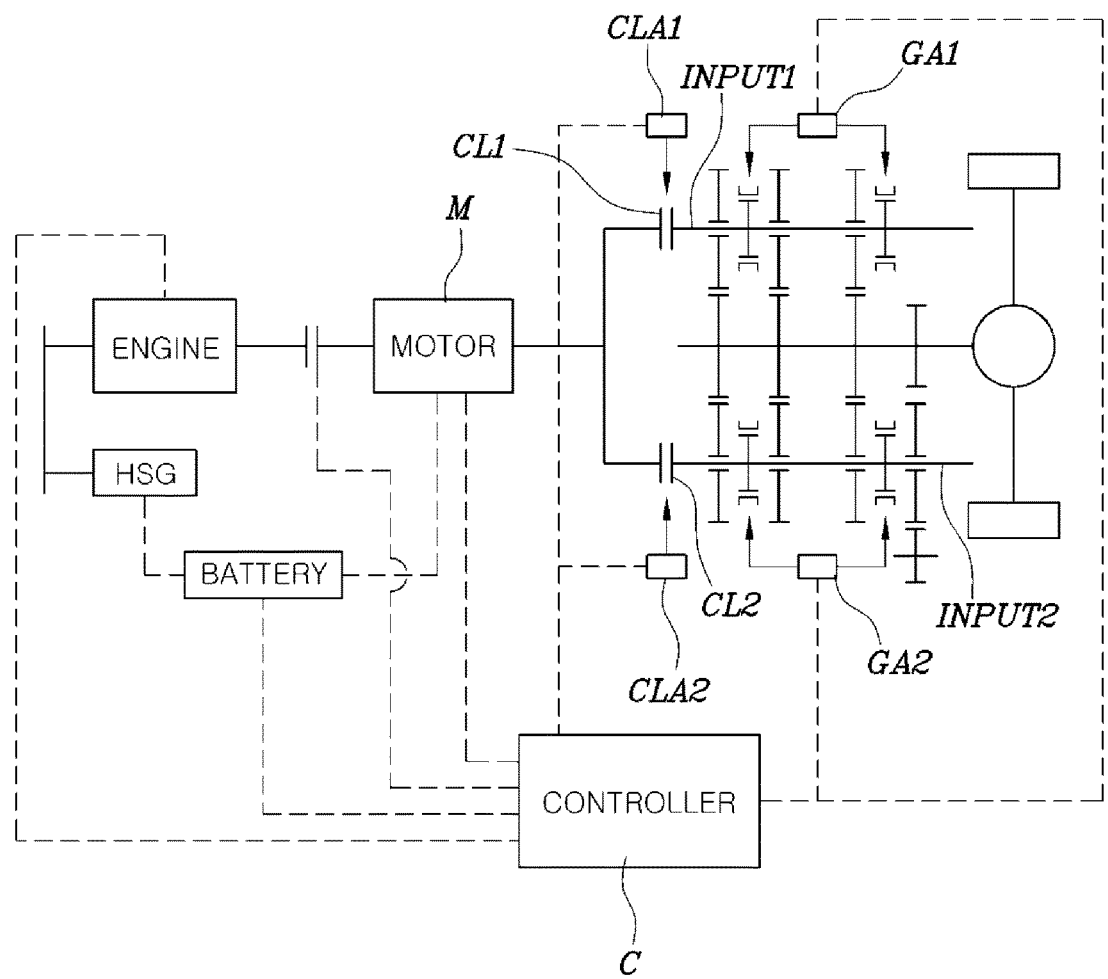
FIG. 1 is a drawing representing overall configuration of a hybrid DCT vehicle to be applied to various embodiments of the present invention.
Figure 2:
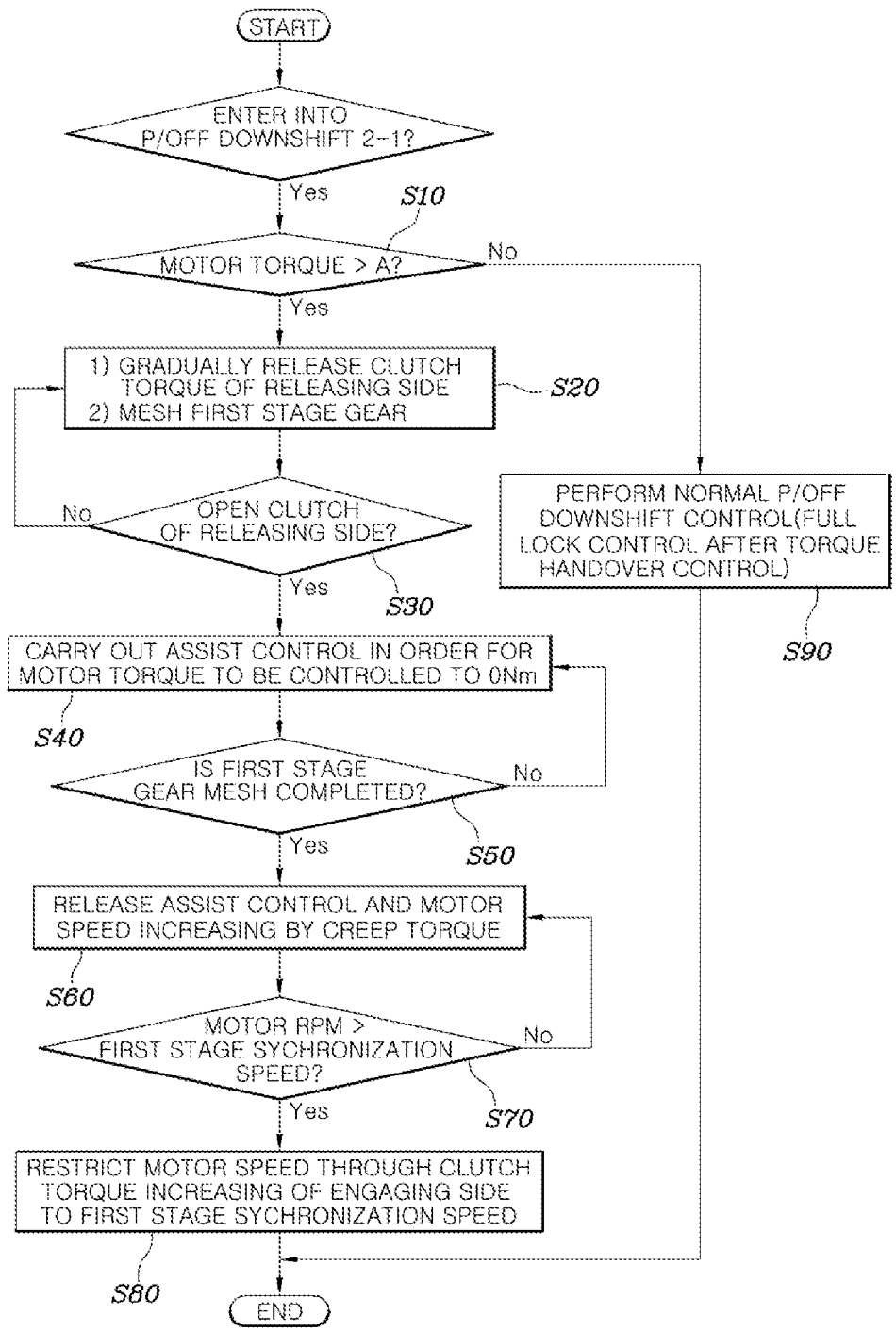
FIG. 2 is a flow chart illustrating the shifting control process according to various embodiments of the present invention.

Explaining various embodiments of the present invention in detail by referring to FIGS. 1 and 2, firstly, in the motor torque determination step, a controller C may determine a state of a motor torque in a power-off downshift shifting process.

At this time, a shifting determination step determining whether a present shifting is a power-off downshift shifting from a second stage to a first stage or not, may be further included before the motor torque determination step.

That is, in a case that the present shifting situation is the power-off downshift shifting from the second stage to the first stage (a lower stage shifting in a state of not stepping on an accelerator pedal), it may be determined whether the motor torque inputted to a transmission is positive (+) torque or negative (−) torque or not.

Given this configuration, various embodiments of the present invention may be applied to a hybrid vehicle mounted with a Double Clutch transmission (DCT) as shown in FIG. 1. Referring to FIG. 1, a clutch of engaging side and a clutch of releasing side among two clutches forming the DCT are designated to reference numbers of CL1 and CL2, respectively. A clutch actuator of engaging side for operating the clutch CL1 of the engaging side and a clutch actuator of releasing side for operating the clutch CL2 of releasing side are designated to reference numbers of CLA1 and CLA2, respectively. Meanwhile, a sign "HSG" denotes a Hybrid Starter Generator.

Furthermore, an input shaft of engaging side and an input shaft of releasing side are designated to reference numbers of INPUT1 and INPUT2, respectively. A first gear actuator and a second gear actuator making shift stage gears provided at the input shaft of engaging side and the input shaft of releasing side to be meshed with each other are designated to reference numbers of GA1 and GA2, respectively.

However, this is only for convenience of understanding various embodiments of the present invention, the engaging side and releasing side may alternatively be changed to each other depending on whether the clutch forming the present shift stage and the clutch for forming target shift stage are any clutch.

Further, when it is determined that the motor torque is (+) torque in the motor torque determination step, the clutch CL2 of the releasing side is released and the target shift stage gear connected to the clutch CL1 of engaging side may be meshed in the gear mesh step.

For example, when the motor torque inputted to the transmission is (+) torque, it is possible to start the first stage gear engagement through the first gear actuator while gradually releasing the clutch torque of releasing side to release the clutch CL2 of releasing side.

In the assist control step, the controller C may control the motor torque to 0 Nm. Hereinafter, the 0 Nm signifies zero Newton meter.

That is, it is controlled that the motor speed heads in the direction of (+) by controlling the motor torque to 0 Nm.

In the rising step, it is able to control the motor speed to be raised so as to follow a target motor speed set at least higher than the input shaft speed of engaging side after the assist control is released.

At this time, the target motor speed may be a motor speed corresponding to a predetermined creep torque.

That is, the input shaft speed of engaging side is increased by a first stage gear ratio through the meshing of the first stage gear. At this time, the motor speed corresponding to the creep torque may be higher than the input shaft speed of engaging side. Thus, it is able to control the motor speed to be increased so as to correspond to the creep torque.

In the engaging step, it is able to engage the clutch CL1 of engaging side by applying the clutch torque of engaging side when the motor speed exceeds the input shaft speed of engaging side.

That is, while the motor speed follows the target motor speed to be increased, if the motor speed exceeds the input shaft speed of engaging side as synchronous speed, it is able to engage the clutch CL1 of engaging side by applying the clutch torque of engaging side such that it can be carried out the downshift shifting from the second stage to the first stage.

According to the above configuration, if the downshift shifting is carried out in low speed driving situation such as 2~3 KPH, the situation that the clutch engaging is lost by the inaccuracy of the Torque-Stroke (T-S) curve may occur.

At this case, since the motor torque is (+) torque, the motor speed has also rising ingredient in a (+) direction. Thus, if the shifting is carried out through torque handover control, the motor speed ingredient toward (+) direction is inflicted by vibrations simultaneously while being applied by the clutch torque of engaging side, thereby causing a shifting shock.

Therefore, in a case of the shifting situation in which the motor torque is (+) torque, by engaging the clutch CL1 of engaging side after releasing the clutch CL2 of releasing side at first and then synchronizing the motor speed to the input shaft speed of engaging side through the control of the motor M, it is able to prevent an interlock shock from being occurred in the related shifting situation, and thus, secure the shifting feelings.

Furthermore, in various embodiments of the present invention, it is possible of carrying out the downshift shifting through the torque handover control engaging the clutch CL1 of engaging side and simultaneously releasing the clutch CL2 of releasing side when it is determined that the motor torque is (−) torque at the motor torque determination step.

That is, the motor speed heads to 0 RPM if the clutch engaging is lost by the inaccuracy of the T-S curve since the motor torque is (−) torque. At this time, applying a clutch torque to the clutch CL1 of engaging side for forming the first stage, the motor speed is controlled to transit to the input shaft speed corresponding to the first stage gear ratio.

Therefore, even if carrying out the shifting through the torque handover, the motor speed may be quickly stabilized while being slightly changed by the first stage gear ratio such that it is able to secure stable shifting feeling.

Hereinafter, the shifting control process according to various embodiments of the present invention will be described.

Referring to FIG. 2, the motor torque condition input to a transmission is determined in a case of entering into a power-off downshift shifting from the second stage to the first stage S10.

The clutch CL2 of releasing side forming the second shifting stage is released and the first stage gear mesh is started when it is determined that the motor torque is larger than A (0 Nm) S20.

On the other hand, a releasing shifting may be carried out through the torque handover control when the motor torque is smaller than A (0 Nm) S90.

Furthermore, it is determined whether the clutch CL2 of the releasing side is perfectly released or not after the step of S20 at S30. When the clutch CL2 of the releasing side is perfectly released, the assist control of the motor torque to 0 Nm is carried out S40. Alternatively, when the clutch CL2 of the releasing side is not perfectly released, clutch CL2 of releasing side forming the second shifting stage is released and the first stage gear mesh is started again.

Subsequently, it is determined whether the first stage gear engaging is completed or not S50. The assist control of the motor torque is released and the motor torque is controlled to rise depending on a predetermined creep torque when the first stage gear engaging is completed S60. Alternatively, when the first stage gear engaging is not completed, the assist control of the motor torque to 0 Nm is again carried out S40.

Thereafter, it is determined whether the motor speed exceeds the input shaft speed of engaging side S70. The motor speed is restricted to the input shaft speed of engaging side by applying the clutch torque of engaging side when the motor speed exceeds the input shaft speed of engaging side S80 such that it is able to carry out the related shifting by engaging the clutch CL1 of engaging side. Alternatively, when the motor speed does not exceed the input shaft speed of engaging side, the assist control of the motor torque is again released and the motor torque is controlled to rise depending on the predetermined creep torque.

As described above, by synchronizing the motor speed to the input shaft speed through the control of the motor M and engaging the clutch CL1 of engaging side after releasing the clutch CL2 of releasing side at first in a case of a power-off 2→1 downshift shifting situation where the motor torque is (+) torque, various embodiments of the present invention may prevent the interlock shock from being occurred in the related shifting situation, thereby securing shifting feeling.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A shifting control method for a hybrid vehicle, comprising:
    a motor torque determination step, of determining the condition of a motor torque, by a controller, in a power-off downshift shifting process;
    a gear mesh step, by the controller, of releasing a clutch of a releasing side and meshing a target shifting stage gear connected to a clutch of engaging side when the motor torque is positive (+) torque;
    an assist control step, of controlling, by the controller, the motor torque to 0 Newton meter;
    a rising step, by the controller, of controlling the motor speed to rise and follow a target motor speed predetermined higher than at least an input shaft speed of an engaging side after releasing the assist control; and
    an engaging step, by the controller, of engaging the clutch of the engaging side by a clutch torque of the engaging side when the motor speed exceeds the input shaft speed of the engaging side.

2. The shifting control method for the hybrid vehicle of claim 1, further comprising a shifting determination step, by the controller, of determining when the present shifting is a power-off downshift shifting from a second stage to a first stage or not, before the motor torque determination step.

3. The shifting control method for the hybrid vehicle of claim 1, wherein a downshift shifting is carried out through a torque handover control of engaging the clutch of the engaging side and simultaneously releasing the clutch of the releasing side when it is determined that the motor torque is negative (−) torque at the motor torque determination step.

4. The shifting control method for the hybrid vehicle of claim 1, wherein the target motor speed comprises a motor speed corresponding to a predetermined creep torque at the rising step.

* * * * *